(12) United States Patent
Rieschl et al.

(10) Patent No.: US 6,766,520 B1
(45) Date of Patent: Jul. 20, 2004

(54) TAPE DRIVE EMULATION SOFTWARE OBJECTS, AND EMULATION OF OTHER PERIPHERAL SYSTEMS FOR COMPUTERS

(75) Inventors: Michael J. Rieschl, St. Paul, MN (US); Kurt N. Johnson, Edina, MN (US); Dave Q. Anderson, Coon Rapids, MN (US)

(73) Assignee: Unisys Corporation, Blue Bell, PA (US)

(*) Notice: Subject to any disclaimer, the term of this patent is extended or adjusted under 35 U.S.C. 154(b) by 741 days.

(21) Appl. No.: 09/590,712

(22) Filed: Jun. 8, 2000

(51) Int. Cl.[7] .............................................. G06F 13/10
(52) U.S. Cl. ........................................ 719/321; 703/24
(58) Field of Search ............................... 719/321, 324; 703/23, 24, 27

(56) References Cited

U.S. PATENT DOCUMENTS 6,378,006 B1 * 4/2002 Murata ........................ 709/321
6,477,591 B1 * 11/2002 VanderSpek ................. 710/38
2002/0004835 A1 * 1/2002 Yarbrough ................... 709/230

* cited by examiner

*Primary Examiner*—Meng-Al T. An
*Assistant Examiner*—Li B. Zhen
(74) *Attorney, Agent, or Firm*—Michael B. Atlass; Mark T. Starr

(57) ABSTRACT

Emulation of a hardware peripheral is accomplished through use of object oriented software and runs in an object oriented environment. Particular adaptation of an emulation to enable specific data storage magnetic tape drive peripheral is described. Use of emulators in general enables continued reliance on legacy hardware and software without maintaining an entire suite of legacy hardware. Simplified emulation structure enabled by object oriented programming described herein makes migration from legacy systems feasible in stages at relatively low cost. In set-up and in use, users can have control over instances of emulator objects, including association with data files that operate as virtual storage media whether initially associated with the emulator or not, using a simple window-based interface for choosing particular data files, opening them, opening new instances of emulator objects and so forth. Variations are also described. Legacy programming is handled by use of legacy instructions communicated to the emulated object instances, which the object instances respond to appropriately.

22 Claims, 3 Drawing Sheets

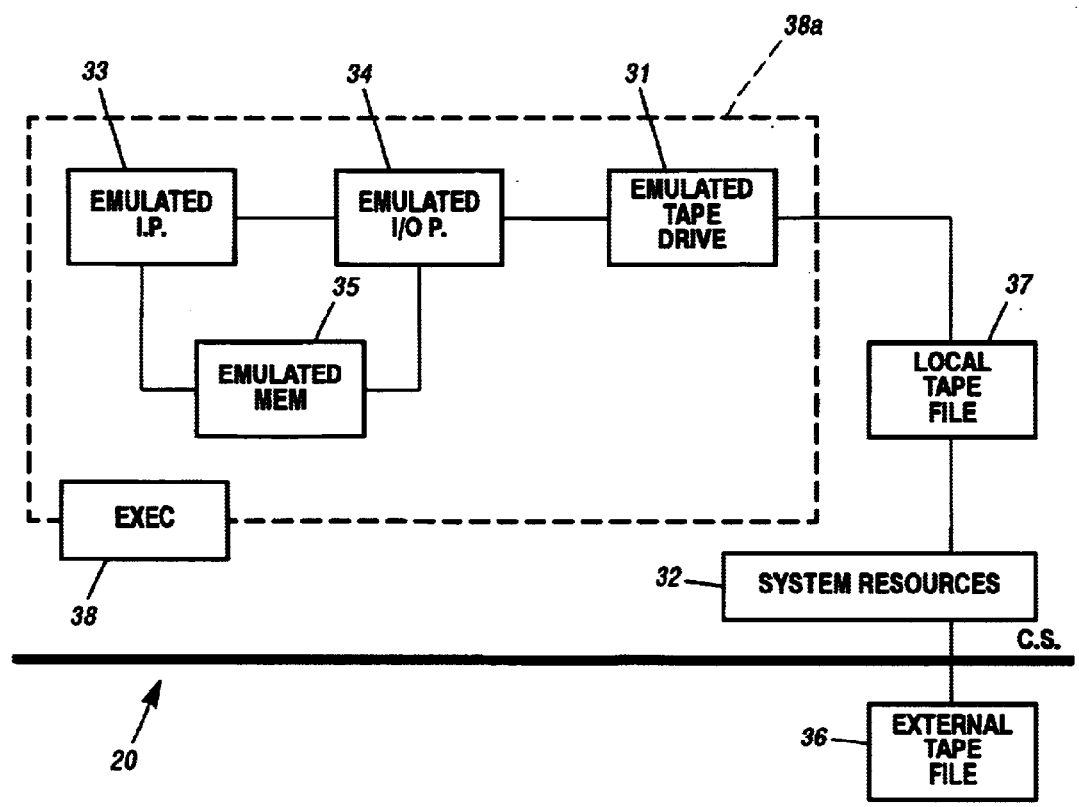
Figure 2 (Old)
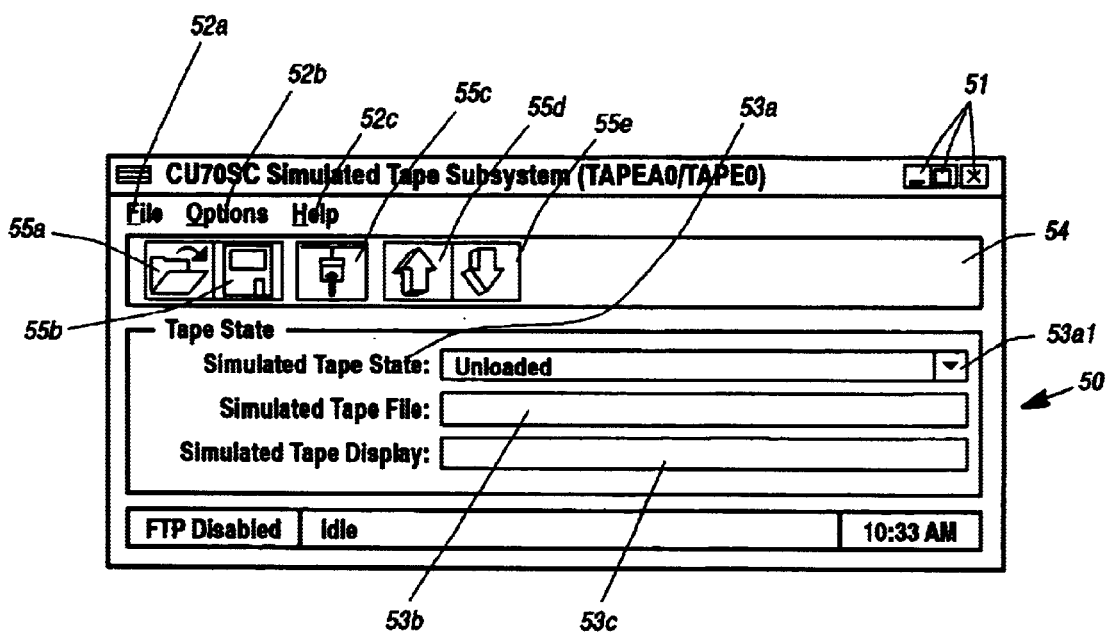
Figure 5

TAPE DRIVE EMULATION SOFTWARE OBJECTS, AND EMULATION OF OTHER PERIPHERAL SYSTEMS FOR COMPUTERS

BACKGROUND

This invention is primarily directed to the emulation of tape drive systems, their activity and data files as software objects, and is useful particularly to support legacy software that requires tape drive systems in their normal operation. The inventive concepts are particularly suitable for modern object oriented applications, and is well suited to use in Windows-based (operating systems of Microsoft Corporation) computing. The concepts defined by the embodiments described have wider application to the field of emulation of peripheral hardware systems generally, however.

A problem with computer systems over time is that legacy systems software is designed for the legacy system hardware and that hardware gets updated and replaced without a redesign of the legacy software. This creates a problem for the user who is using the computer for a number of tasks and cannot afford to have a rewrite of the legacy software accomplished, but needs new hardware for his other computing needs. A particular case in point is with Unisys Corporation's 2200 series computer systems that used to have tape drives as the boot volume required for start-up of the-system. For a computer system user who needs to continue to use system or application software or both that require the 2200 computer, but who can no longer maintain such a system, a way to emulate the processor functions would enable him to run his 2200 legacy software on, for example a WINDOWS (Microsoft Corporation Operating System trade name) computer system, if the system also had a processor emulator for emulating the 2200 system. A way to do this is available in a software or hardware based 2200 processor emulator. However, as mentioned before, some of this software will rely on the existence of a magnetic tape drive system that was available with the legacy hardware, and rewriting old software is not the most productive use of coding resources.

(Processor emulation too is known, see for example U.S. Pat. No. 5,751,982, Morley, in which software emulation of a microprocessor is described. Too, emulation of processors via plug compatible emulation hardware is also known, as for example are seen in U.S. Pat. Nos. 5,497,456 and 5,727,217.)

Accordingly there are substantial business needs or reasons to have tape drive peripheral emulators available in software.

A number of attempts have been made to emulate various features of tape drives and are described in the patent art. For perhaps the closest example, see U.S. Pat. No. 5,297,124 issued to Plotkin, et al. In this patent, a disk drive is made to emulate a tape drive in a "plug compatible" fashion. Accordingly it requires a hardware interconnect device containing a processor, RAM, ROM, and supporting components to produce tape drive like responses for the host computer system addressing the Plotkin et al disk drive acting like a tape drive.

Earlier a patent issued to Kantner, U.S. Pat. No. 4,511,963, which described how to deal with the echo (verification) transmissions between the tape drive and the processor, among other things.

Brikner and Sankey in U.S. Pat. No. 4,727,512 described another interface system for allowing a computer system with a standard tape drive interface to communicate image data with such a computer, and Osterlund, in U.S. Pat. No. 4,775,969 described how to store and retrieve tape drive formatted data from an optical disk drive.

All these four patent references are incorporated herein hereby, in their respective entireties, for the disclosure they provide of the relevant features stated therein.

However, none of the art appears to have developed a tape drive emulator that was simply operating in software available to the computer system to be used by other software programs, legacy or otherwise, in the same computer system.

Unisys Corporation has developed simulators before too, but these were not developed as software objects, and therefore would require invocation of a processor simulator to enable a tape drive simulation. The tape drive simulators thus provided were not available for other uses, nor were they directly accessible by programs that did not go through the processor emulator to address them. Because of the tight coupling of the various parts of the emulation subsystems, the programming and use flexibility of having an emulated peripheral be a software object was unobtainable. For example, once a system with instruction processor (emulated or otherwise) was set up having associated emulated memory, and emulated input output (I/O) processor, the number of peripherals, or processors for that matter was set. With an object oriented design, once the class is determined, new instances of the software object subsystems (tape drives, disk drives, et cetera) can be created and used without having to redesign or reconfigure the system. Further, no external resources were available to the prior design system by Unisys. In the object design, this limitation will not exist.

Another important feature of a tape (or other legacy peripheral) emulator would be to allow the user to transfer tape files from remote systems to a Windows workstation without having a tape drive on the workstation, and having the ability to transfer the files back to the remote system (for example a legacy Unisys 2200 computer system with a CUSC70 tape drive) would also be valuable. Because the emulator would be built to use the Windows I/O to access files the emulator would be able to read from any standard Windows compatible peripheral device, including the ubiquitous CD-ROM, DVD or any other device with a Windows driver. The old emulator designs for Unisys legacy systems (a full systems emulation software suite called FLIT) were limited in use to reading from 2200 peripheral devices. One example would be the Windows operating system and accessory software file location features could be taken advantage of by software running an emulator in accord with this invention to find files in any peripheral to be used by the emulator. Further, other programs can communicate with the inventive emulator using the standard object oriented interfaces. These interfaces are commonly called object properties, methods, and events. Obviously these adaptabilities were not available when using a tape emulator as part of a 2200 system emulation.

Accordingly, if a tape drive emulator were developed as a software object, these limitations would be ameliorated and the transition from legacy systems to modern systems could be made more practical and efficient.

In an object oriented programming (OOP) environment, the software system within a computer system facilitates the actions of the instances of objects within it. The environment also allows for the programmer creation of classes of objects from which programs or users can create object instances.

Programs can operate outside of the OOP environment and the OOP environment can receive and send messages to such outside programs in order to facilitate use by such outside program entities of the instances within the OOP environment. The outside program entity would need to know the name or other addressable feature of the object instance, and the object instance would be able to respond only if the OOP or the instance itself could address the outside program entity. Entities within the OOP environment also, of course, can pass messages between themselves as facilitated by the OOP environment. Addressing is typically done by sending a message bearing the name of the entity being contacted and the name (or other addressing link feature) of the sending entity can be in the message or kept track of by the OOP environment. Thus reply messages can be easily returned to the sending objects or outside program entities. The messages themselves can carry instructions or changes to properties of the object instance being addressed, or can even call for the destruction of the object instance. Objects, outside entities, programmers and users can all create object instances using predefined classes, and programmers, outside program entities, object instances can create and modify existing object classes.

Of particular use in the instant invention is the ability of the OOP environment to allow assignment of data files to object instances, wherein the object instance has some control over the data in such a file. Of course, the data file would be considered either a subsidiary object to the inventive emulator instance or, if more than one data file is loaded, a group of objects . In the preferred embodiment, a file object can get locked to the emulator instance by the user using a browse window, like the one used in Microsoft Word's(A trademark of Microsoft Corporation) FILE/OPEN command. A browse window is an existing Microsoft object that is created by the MENU/FILE/OPEN command sequence. (In non-Microsoft systems one can employ similar devices to open similar objects to such browse windows to accomplish the same result). Using this browse window object the user can scan through the available library of data file objects identified to the browse window. Once the user finds the file he wants (which in the preferred embodiment will be in the Tape File format), the user then selects it. By this selection activity, the data file subsidiary object (a particular tape reel equivalent) is "loaded" or locked to the emulator object instance, and the data may be read from or written to this tape file through the emulator object instance. In the tape drive world, the loading and unloading of tape files was an operator activity, thus in the preferred embodiment it will be accomplished by a user through the browse window, although there is no reason, that where this task needs to be automated, a program could not also perform this selection and/or loading/unloading function.

These efficiencies of data management to allow simple locking of what may have been previously unavailable tape reel data files to existing emulator instances were not previously available to users of storage device emulators. In prior art emulator systems the tape file had to be loaded with the emulator software. Thus the flexibility of applying OOP environmental features to data storage device emulation becomes a valuable feature of the invention.

OOP environment operative facility is well known to people with experience in OOP, and these features are advantageously used as described herein to overcome the problems and recognize the values just outlined above. The invention is not limited to any particular OOP environment, but Visual Basic was used to develop the preferred embodiment.

BRIEF DESCRIPTION OF THE DRAWINGS

FIG. 2 is a block diagram of basic components of a system employing a prior emulator system design.

FIG. 5 is a user controlled window employed to communicate with the software object in the preferred embodiment of this invention.

SUMMARY OF THE INVENTION

Figure 1:
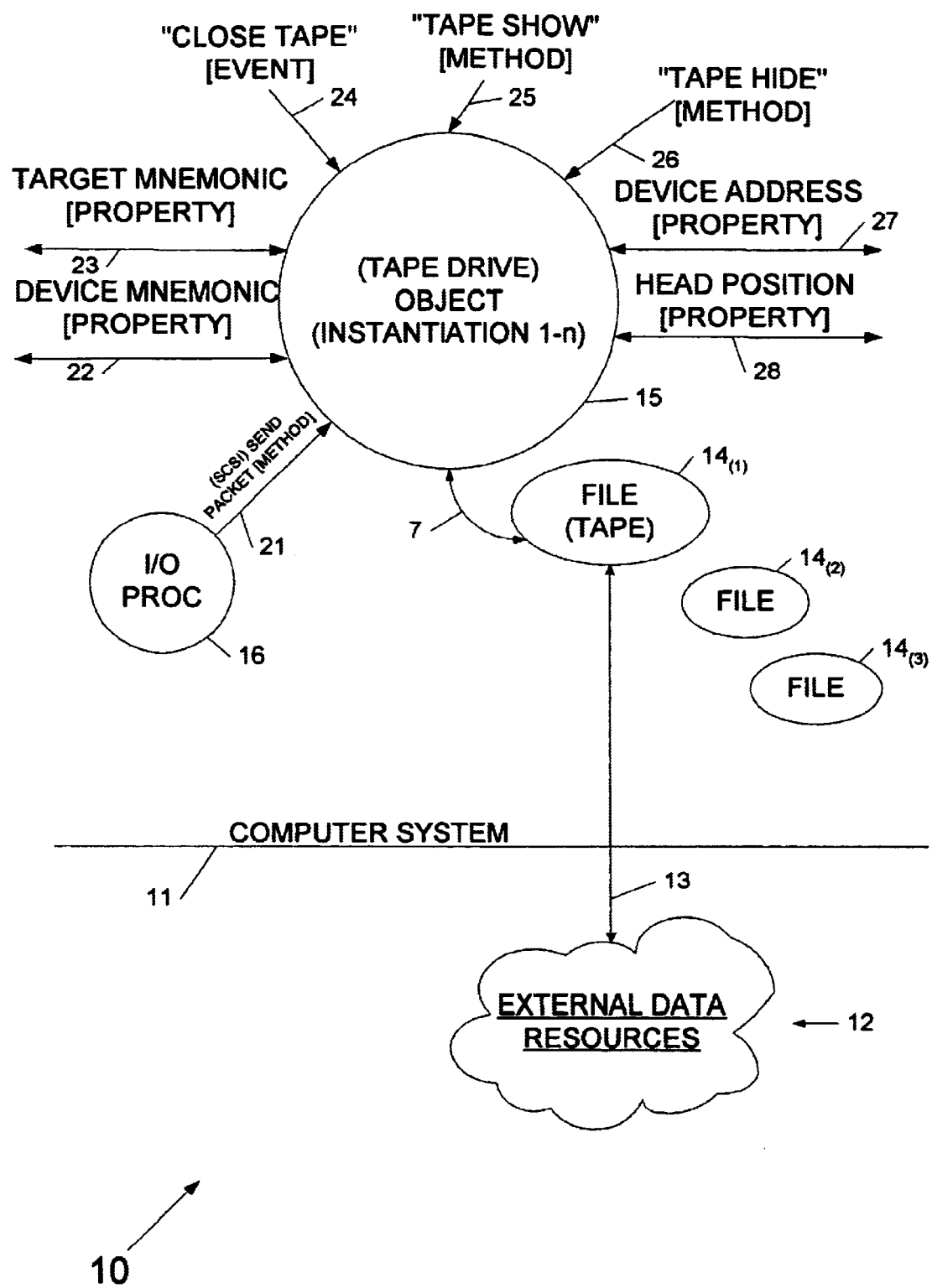
FIG. 1 is a heuristic diagram of the software object class, identifying typical methods, events, and properties required for the preferred embodiment of the invention.

A peripheral system is simulated in software as a software object. The preferred system is a tape drive peripheral. It has available through its interface access to "events", responds to "methods" and exhibits changeable "properties". It is responsible to provide and allow for modification of properties as well as data in an associated tape file that is preferably formatted to be in tape drive format of a legacy system so that any packets of data it sends to or receives from a client (preferably an I/O processor or simulated I/O processor) will be appropriate to legacy hardware and/or legacy software. In any event if the software object is used to emulate a legacy tape drive to communicate with legacy software or hardware or even new software or hardware that mimics a legacy system, the software object will need to have a tape drive instruction interpretation block that can communicate with these systems. (In the preferred embodiment these instructions will be in the form of SCSI packets). It will also employ a data field manipulation block to push the data between the tape drive emulator software object and any other software that needs the data as well as to push it into and pull it out of a software file that acts like the tape a tape drive would have access to. The software tape file has a set of data fields within it, and each data field has a body with the data in it and a header field which delimits the body field and preferably identifies the size of the associated body field. (In tape drives, the storage of data is typically done in variable length fields so this information as to size would be needed for legacy emulation systems.)

The tape file could be an independent software object, accessible by other tape drive emulator object instances if desired, or it can be tightly coupled to a particular instance of a tape drive emulator software object.

Because the peripheral emulator software object is an object class, it can be created in any number of instances and given unique identities for each such instance. These identities can be called mnemonics for the target and the device. They operate as properties of the object instance. Other properties in the preferred embodiment tape drive emulation software object will reflect the virtual position of the tape drive head relative to the tape file and the address of the data field for the head position so that the tape drive instruction set can be used with the tape file associated with this instance. If the software emulator object were a disk drive object, it would not maintain a head position property.

Also, the emulator object of the preferred embodiment will be responsive to closure events from any calling program.

Further, the emulator object will be provided with a display window method (that could also be duplicated as a program callable method) through which a user can see the properties of the object instance and load and unload tape file objects.

External data files are available to the object instance through either the display window method or a program, for attachment to the file associated with the object instance.

Thus an inventive method of employing an emulation object for a peripheral is disclosed which is effected by creating an instance of a software emulator object class, communicating legacy instructions to said instance, said instance operating on a legacy formatted data file, communicating data between itself and a program that is communicating said legacy instructions, and updating said legacy formatted data file in accord with said communications.

An event for an instance of the emulation object includes closing the instance when the software that needed it finishes with it without affecting any other instance. As is normally the case with object oriented software, the object would be sent an event message saying to close, and the object would close itself, in the preferred embodiment. The tape and control unit mnemonics can be set either through a window available to a user (called a show method, because a window is displayed to the user) or by another program which sets the mnemonics and other properties directly for the instance. Operation of the emulated device will obviously change the values of some properties of the device, notably Device Address and Head Position, so that would be an example of a program type that would operate the properties of the object instance.

DETAILED DESCRIPTION OF THE INVENTION

FIG. 1 illustrates a preferred embodiment tape object class 15 which can be instantiated any number of times (1 to "n"), set in a computer system environment 11, thus forming a system 10. The system 10 may provide a link 13 to external data resources which may include files of any type handled by the computer system environment 11. For a software object which is a data tape file, such as software objects 14(1–n) to communicate with the object 15, a link like link 7 must be established by loading the data object (14(1)). This can be done using a user window as is described elsewhere, or can be done through a program. Once the tape data file is loaded, the software emulation object 15 can read from and write to it in the format prescribed for the tape drive. In the preferred embodiment, the tape format has a 9 byte (using 8 bit bytes) header followed by an unfixed range of data, the software object is emulating a Unisys Corporation CU70SC magnetic tape drive, and the preferred computer system environment is a Windows (trademark of Microsoft Corporation) based computer system. The preferred embodiment software object will respond to "methods" (like for example, methods 25, 26), and "events" (like, for example, Close Tape 24) and maintain a "properties" (like the address 27, head position 28, target Mnemonic 23 and Device Mnemonic 22) through the interface used by objects in this computer system environment.

Processes and associated computer software for making various software objects are generally known, as are processes for hosting them on computer systems. Because the variability in how an implementer may choose to make software objects is so great, and because the process is and has been known for some time, overly specific details regarding the building and hosting of a software object as is described in this invention are not explained. One of ordinary skill in the art of object oriented programming would not be required to exercise undue experimentation to produce the inventive software objects described herein, nor to provide them with the functionality described after reading this document.

Generally, a class is defined using a language, like Visual Basic, although there are many others available. Instances of the class, sometimes themselves called, simply, objects, are then created when an event calls for them or directly by an operator. An event that closes the instance simply sends a message to the instance and the instance closes itself For an understanding of the contrast to object oriented programming, it is useful to look at the prior way of doing a simulation system. Refer briefly to FIG. 2 in which a prior simulation system 20 is shown in block diagram form, the nature of the closely coupled emulation components is best illustrated by the communications bottle-neck created by the executive segment 38 of the emulation program 38a. Each of the components, the emulated instruction processor 33, the emulated input output processor 34, the emulated memory system 35, and the emulated peripheral system, here a tape drive emulator 31, could all only communicate changes in their states through the exec 38. Too, as indicated elsewhere in this document, the tape file 37 to be accessed and used by the emulator program had to be created and extant on the computer system C.S. to run the emulator. The emulator had to be reconfigured if a call to other system resources 32 was required to get data from some external tape file 36, outside the computer system. It should also be noted that the communications from each of the components were limited to single channels, the I/O Processor emulator 34 having the only link to the peripheral tape drive emulator 31, and having to push and receive data through the memory emulator 35, and instructions from the instruction processor emulator 33. The executive was required to coordinate all this activity as well. Contrasted with the inventive system of FIG. 1, it will be apparent to the reader of skill in these arts that the flexibility in set up, programming, debugging and reuse of components available through the inventive design is far different from what would be available in the FIG. 2 system design of the prior art.

Because the preferred and original embodiment of the inventive software tape emulator object is an emulation of a CU70SC tape drive, the format of the method communications with this object will be the same as the format for the actual CU70SC tape drive (a tape drive unit available from Unisys Corporation, the assignee of this patent). The format for communications via arrow 21 is therefore through a SCSI standard packet protocol, although for other peripheral objects their standard protocol should be adopted for this function. Because in the preferred embodiment an I/O processor or an emulator for an I/O processor 16 is the client/user/driver to or of the object 15, the form of the communications will be limited to the protocol and instructions available to the CU70SC tape drive, or if a different peripheral, to its protocol and instruction set. These instructions are detailed below. In debugging a software object in accord with this invention, a programmer would not need to create an entire run-time enabled I/O processor, but simply something sufficient for the object 15 [FIG. 1] to interact with. The process of providing communications with an object is, in object oriented programming, called a "method," and we adopt this term herein.

When an instance of a preferred embodiment tape emulator object 15 is created (an unshown "event"), in the preferred embodiment there is no tape file object associated with it when it is created. This allows for more of the flexibility we have talked about. If the system has a tape file in it (like objects 14 (1–n) in FIG. 1), the operator can link the tape emulator object 15 to it using the command sequence MENU/FILE/OPEN, thus selecting the file just as a user of nearly any common program, Microsoft Word, for an example, selects a data file to use with a program today. The tape files are created to hold the data that the emulator would have available if it were an actual tape drive in other processes, and they may be outside the computer system in external data resources 12, linked into the data file or brought in as data through line 13. If the data object to be linked to were a disk drive or a file in a disk drive in area 12, a similar volume of computer system 11's memory resources (not shown), would be allocated, although the formatting of that space would be set up for the mimicked tape drive. Thus, any file addressable by the user can be linked as loaded to the software emulator object 15, or unlinked and thus unloaded or dismounted from the emulator. If an emulator object is set up to mimic a disk drive, the formatting of the data objects should match the data transmission/receipt format for the mimicked disk drive, just as the format for the preferred embodiment tape drive emulator objects matches the input output format for the actual tape drive's tape files.

To reiterate, the data area or volume for the tape, can be loaded by the object by the operator giving the name of the file, to the object 15, through a menu system by which the operator selects the file name to be loaded. The data file which is emulating a data tape can even be located outside the computer system itself, involving external data resources 12, which can even involve a call to an internet address, or to a SAN memory address, or to just a local disk or tape drive address. In prior art systems where a tape drive may have been emulated, a specific and identified tape file volume would have to be set up and a part of the computer system with the emulator running at start-up and it could not change without reconfiguring all the other emulation components of the system being emulated, including the emulated processor, the emulated memory, the emulated I/O processor, and any other pieces in the system.

Figure 3:
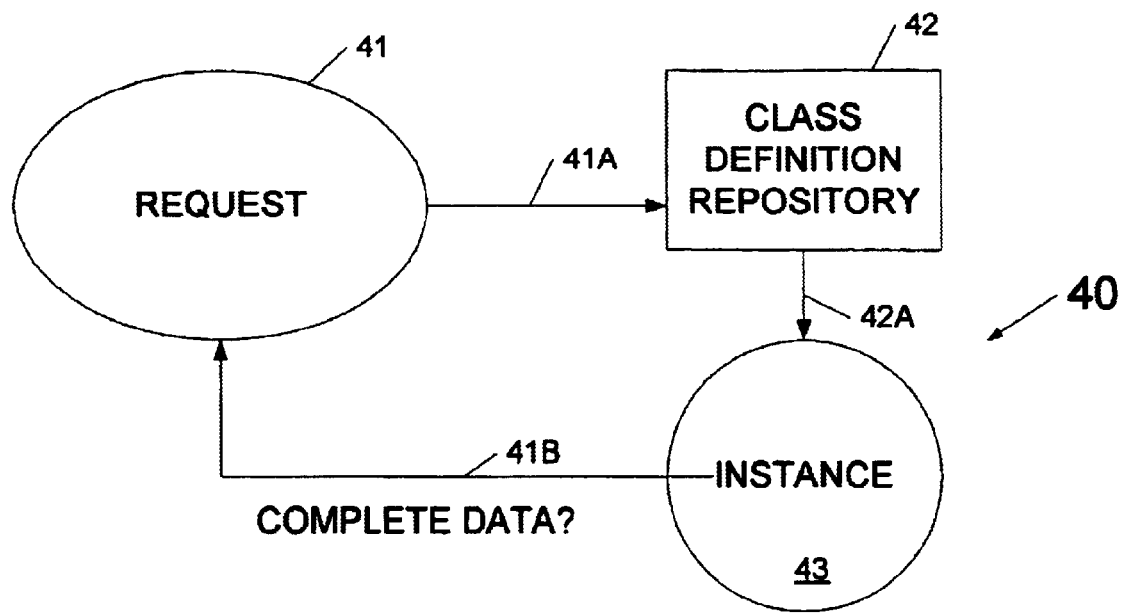
FIG. 3 is a block diagram illustrating the creation of a generalized software object in accord with one aspect of this invention.

The preferred embodiment software object 15 will thus be obtained from a class definition repository containing the code to make instances of the object and to make them behave as stated, preferably by a call from a user window or a program, the instructions from either of which can be handled by the class definition repository. This is process 40 is illustrated with reference to FIG. 3, in which a class definition repository program 42 (CDR) is called by a requesting client 41 with a request 41a. If the CDR has enough information to create an instance of the kind of object being requested, it creates space for one and sets up its resources (here this is all indicated as an action by line 42a), thus creating the object instance 43. If the request did not have enough data and it is otherwise unavailable from somewhere known to the CDR program 42 in the system, the CDR will currently refer the problem to the error handling system and return an error. Later, more automated versions may request more complete information from the client making the request 41.

Figure 4:
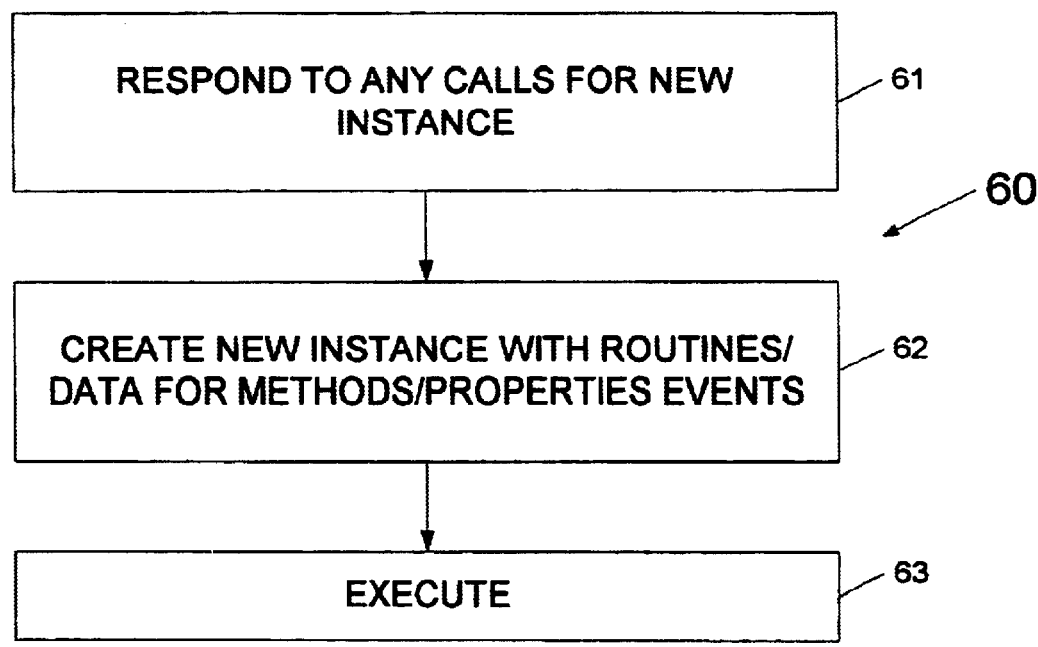
FIG. 4 is a flow diagram of steps of a preferred process of employing the emulation of this invention.

This process generally is visualizable in the flow chart 60 of FIG. 4. The language itself, or a class definition repository as described in FIG. 3 responds to any call from a user or a program for a new instance of an object that has been defined (step 61). This new instance is created 62 with methods properties and events appropriate to the class and which essentially define this instance. At this point the instance itself can execute 63, any time a message is sent to it. These messages are defined instructions which this class responds to and are detailed below.

In FIG. 5, A window 50 is shown in accord with a user window that would be used by a user with the invention to enable user activities with respect to the class of objects. Preferably for every instance of an object a part of the program code supporting the object will also support a window such as this for user interaction with the object.

Under "File" 52a, the following instructions should be available: OPEN TAPE FILE . . . , SAVE TAPE FILE AS . . . , CONNECT TO FTP . . . , DOWNLOAD TAPE FILE . . . , UPLOAD TAPE FILE . . . , and EXIT. (In the preferred embodiment they may be abbreviated so that OPEN TAPE FILE may appear as "Open", for example). The EXIT instruction would simply close the window, sending the HIDE TAPE instruction as a method to the instance of the object class that the window was previously opened for. (In keeping with Windows protocol, the "x" at 51 would provide the same function redundantly). The OPEN TAPE FILE instruction will preferably put the file in a loaded state. In the preferred embodiment, the instruction OPEN TAPE FILE is a function identical to mounting a physical tape on a real tape system. Recall that a tape file is equivalent to a tape reel or tape cartridge. A directory of tape files would be considered a repository of tapes. If someone operating the emulator wants to load some data into the system, s/he would mount (OPEN) the tape file (reel) that has the data. The tape file will then be connected to or linked with the object. This relationship is shown by the double-headed arrow connecting the file 14 with the tape drive object 15 in FIG. 1. (It would be preferable to have a program establish instances of objects from a class, but it may also be desirable for the user to be able to do so, and in such cases a window like the one here illustrated in FIG. 5 would preferably be used by the user to call the class definition repository to create an object instance.) The name of the tape file can be changed with the SAVE TAPE FILE AS . . . instruction, creating a copy of the instance. With either of these last two described instructions placed through the window by a user, the program that is the window illustrated in FIG. 5 will be in effect handing property values to the object instance. (Refer briefly again to FIG. 1 and note that if a tape is opened a target address or name, (here called the TARGET MNEMONIC 23 and DEVICE MNEMONIC 22) would need to be specified, for a preferred embodiment software object instance). If the instance is not already created it would be preferable to establish these mnemonics 22 and 23 through the Options menu 52b under a set of choices preferably called "CONFIGURATION". It is also preferred that the user have available through this user window (via an Options menu choice or buttons if preferred) the ability to specify the tape and device address. The mnemonic names may be set either through the TargetMnemonic or DeviceMnemonic properties via a program, or through the user interface window like FIG. 5. The device address and any other properties in the emulation object instance should be settable and alterable in the same manner as the mnemonic names. The other menu choices available through the File menu 52a provide other functions that allow for saving the tape file of an object identified to this window, connecting the object to a file transfer object, and downloading a tape file specified as part of the menu choice into the file allocated for the object instance identified to this window. In preferred embodiments, a help menu 52c would be available also to explain the functionality of any parts or menu options available from this window, and may also have information about the peripheral being emulated that is associated with this window.

Emulated Tape File Format for the Preferred Embodiment Tape Emulator Software Object. (TTF Format)

The emulated tape software program uses a tape file to represent the actual tape. The tape file has an 18-byte header followed by 110 reserved bytes. The header has the following information.

A piece of data called *FLIT* in 6-bit byte Fieldata (4.5 bytes) another 36 bits is not used (4.5 bytes). The value of a maximum tape size is defined, in 36-bit words (the next 4.5 bytes). The next available sector number is identified. (A sector is 126 bytes). Then a space is reserved (consisting of 110 bytes).

Starting on the next sector (126 byte) boundary the first block header is located. The block header is always on a sector boundary and is 9 bytes. The tape's data related to the block header follows the block header. The format of the header block is:

Valid bit. Set if this block is valid (1-bit).
Not Load Point bit. Set if this is not the first block (1-bit)
EOF bit. Set if this is an end-of-file block. There is no data associated with this block. (1-bit).
Reserved 3 bits.
Bytes in this block (30 bits). Does not include this 9- byte header.
Reserved 6 bits.
Bytes in previous block (30 bits). Does not include this 9-byte header.

Emulated Tape Features

The following commands/fields are defined for use by the user, which preferably would be a person, but in some embodiments could be an I/O processor emulator, a real I/O processor, or a program that performs some of the functions of an I/O processor to communicate methods with the tape drive emulator software object. The window which has the following commands will be available to the user through window 50. The first set are located by clicking on the menu headers 52*a–c* of like name in FIG. 5. The rest are available right on the window 50, in areas 53*a–c*.

File Menu (52*a*)

Open opens and selects the simulated tape file (Preferably in TTF format, the format of the CU70SC tape drives). (Earlier, we had called this command "OPEN TAPE FILE.")

Upload uploads and selects the simulated tape file (TTF format) from whatever is requiring the tape drive emulator software object to do this.

Download downloads the selected simulated tape file (TTF format)

Save As saves the selected tape file (TTF format) to the workstation or other location programmed in or specified in the Save As command.

FTP controls the FTP connection

Exit exits the application

Options Menu (52*b*) is the simulated tape hardware options available under this menu header. The minimum options are the SCSI bus and LUN address.

Help Menu (52*c*) is the standard Windows-type help information menu but may be modified as needed, of course.

Simulated Tape State (53*a*) is either loaded or unloaded (open or unopened) for this instance.

Simulated Tape File (53*b*) is the name and path of the selected tape file, which the user can clearly fill in into this space.

Simulated Tape Display (53*c*) is the display from the SCSI display command.

Help (52*c*). This is also considered a menu item, but in the preferred embodiment directly goes to a help program.

The Following Buttons are Defined in the Preferred Embodiment.

File/Open (this button is preferably an image of a file folder) 55*a*. This is the same as an OPEN TAPE FILE command or Open.

File/Upload (55*d*). This is the same as the Upload command from the File menu 52*a*.

File/Download or File/Save As (55*b*) button. This allows for the naming or renaming of the tape file being saved just prior to actually saving it, and is, of course, the button to execute the SAVE TAPE FILE AS or Save As command.

The following ANSI SCSI command packet commands are emulated by the preferred embodiment tape drive emulator software object and software routines for each one should be made available to each instance in order to emulate the CU70SC tape drive. Similarly named routines that can execute similar commands for objects that can be used for emulating other peripherals as should be apparent to the reader following review of this disclosure in which these packet commands are described:

ERASE—This instruction acts to erase the tape data file.

INQUIRY—This instruction tells the (emulated tape drive) instance to send information regarding the instance's parameters to the program/object sending this instruction.

LOAD-UNLOAD—Same as an Open—Dismount. Acts to cause the tape emulator instance to mount a tape file to the tape emulator object, or dismount one if the instruction is UNLOAD.

LOCATE—In tape drives, one may move directly to a particular block directly instead of reading through block to get there. This instruction is needed for continuity with the physical tape drives and allows the issuer to jump to the block on the tape (or the tape emulating file) the issuer specifies.

LOG SELECT—This is an instruction to the tape drive to manage statistical information the physical tape drive could keep. The object class should include a property or set of properties to truly emulate the physical tape drive.

LOG SENSE—This instruction allows the host or managing program interfacing with the emulator instance to read out the logs kept by the previous instruction(s).

MODE SELECT—This instruction allows the host to configure the tape drive to operate in a particular mode.

MODE SENSE—This instruction causes the emulator to report the particular mode it is currently in. It should correspond to the last MODE SELECT instruction sent it by a host.

READ—Issuing this instruction causes a data block to be transferred to the requesting program in accord with any parameters associated with the READ instruction.

READ POSITION—In the headers of blocks of data on the tape, position information should be kept in order to emulate the availability of this data in actual tape drives. This instruction would cause the position data to be given to the requester.

REQUEST SENSE—This instruction causes the emulator instance to transfer sense data to the initiator. Sense data in actual tape drives was a field of bits containing information on things like the position of the read/write head, the condition of the head, the last time maintenance was performed. In an emulation, such data could be generated by the emulator.

REWIND—This instruction tells the tape drive to position the tape to the beginning of the tape. In the emulator, this would be the first data file or block in the tape file.

SPACE—This instruction provides a variety of parameter controlled positioning functions so that the issuing program can move around on the tape file. Thus an instruction to SPACE forward 16 blocks means move forward 16 headers (which indicate the start of each data block, of which there were typically less than 20 on the drives of the type we emulate in the preferred embodiment).

TEST UNIT READY—This is an instruction asking the instance to say whether it is ready for other instructions. Parameters sent with it could include testing whether the tape (file) was mounted, whether the sensor was operative, and the like.

WRITE—This instruction transfers a block of data from the host and writes it to the tape file.

WRITE FILEMARK—writes one or more file marks on the tape. A Filemark is a header with an End-of-File bit set.

These are the instructions that an I/O processor, under program control, would use with the tape drive emulator software object to get the tape drive emulator software object instance to manipulate data in the tape file associated with itself.

Construction Details

The preferred embodiment tape drive emulator software object is a CU70SC Simulator that runs in a Windows NT environment. It is distributed as an ActiveX-type DLL. An ActiveX DLL is a process (or program) for giving instances of the emulator objects properties, methods, and events. In the current embodiments the tape drive emulator software object is implemented in Visual Basic, thus the description is in Visual Basic syntax. The reader of skill in this art will recognize this as just one set of statements that can be modified for various similar emulator systems within the ambit of this invention.

The DLL is an in-process component that displays Modeless forms. This requires that the DLL communicate with the client's message loop. The following applications support display of modeless forms by in-process components:

Applications created with Visual Basic (VB) 5.0 or later.
Applications created with Microsoft Office 97 or later.
Applications that have the VB Technology logo.

Thus, a preferred embodiment could be built in any one of these languages, or others like them, and less preferred embodiments could be built using various software routines in various languages that conform otherwise to the description herein.

Thus, an instance of an ActiveX DLL emulator class for a tape drive emulator object in accord with the preferred embodiment would have some or all of the following attributes:

CloseTape (Event)
Indicates the user is closing the simulator.
Syntax
Sub tape_Close(intCancel as integer)
Remarks
The close event occurs when the user attempts to exit the CU70SC simulator. Cancel is an integer. Setting this argument to any value other than 0 stops the termination.
TargetMnemonic (Property)
Sets and returns the target mnemonic name.
Syntax
[form.]tape.TargetMnemonic[=setting$]
Remarks
This name is used for display purposes and does not have to be set for simulation.

Data Type
String
DeviceMnemonic (Property)
Sets and returns the device mnemonic name.
Syntax
[form.]tape.DeviceMnemonic[=setting$]
Remarks
This name is used for display purposes and does not have to be set for simulation.
The default name is Device.
Data Type
String
Device Address (Property)
Sets and returns the device address.
Syntax
[form.]tape.DeviceAddress[=setting$]
Remarks
The device address is compared to the logical unit number field of the SCSI packet. If the address do not match a check condition will occur.
Data Type
Integer
HeadPosition (Property)
Sets and returns the byte offset of the tape head.
Syntax
[form.]tape.HeadPosition[=setting$]
Remarks
The setting of HeadPosition is normally used during debug. Setting the head position will affect simulation.
Data Type
Long
TapeShow (Method)
Displays the tape simulator window.
Syntax
[form.]tape.TapeShow
Remarks
The tape should always be displayed to allow the user to mount tapes.
Parameters
None
TapeHide (Method)
Hides the tape simulator window.
Syntax
[form.]tape.TapeHide
Remarks
The tape should always be displayed to allow the user to mount tapes.
Parameters
None
SendPacket (Method)
The SendPacket method sends the SCSI packet to the simulator.
Syntax
[form.]tape. SendPacket(bytScsiPacket,bytStatus, bytData,lngTransfered)
Remarks
The SendPacket method issues the SCSI packet to the simulator and receives the SCSI status and sends/receives optional data. LngTransfered is set to the number of bytes that were transferred.

Parameters bytScsiPacket as byte( )

bytStatus as byte bytData as byte( )

lngTransfered as long

The attributes are performed by software routines, or programs, available to the object as part of its definition and preferably in the DLL or equivalent software entity.

For completeness, we have included a piece of Visual Basic code that creates three instances of a tape simulator, assuming the class has been defined. This code also uses the TapeShow method, the setting of properties, and, in a second piece tests one instance by sending a SCSI packet of tape file data to the instance.

This Visual basic program shows the creating of three tape object instances as hard coded using three sets, but the code could just as easily be written to allow the dynamic creation of tape objects. Pseudo code for this would be quite similar. (The "'" mark or apostrophe indicates that the language following it on the same line is a remark).

Private Sub Form_Load( )

Set Tape1=New clstape' Create first instance

Set Tape2=New clstape' Create second instance

Set Tape3=New clstape' Create third instance

Tape1.tapeshow' Method means a window will be displayed lot this instance (Tape1)

Tape1.targetmnemonic="Tapea0" ' Set properties

Tape1.devicemnemonic="Tape0"

Tape1.deviceaddress=0' this property says the tape is at the start of the tape.

Tape2.targetmnemonic="Tapea1"

Tape2.devicemnemonic="Tape1"

Tape2.deviceaddress=0

Tape3.targetnmemonic="Tapea2"

Tape3.devicemnemonic="Tape2"

Tape3.deviceaddress=0

End Sub

Private Sub Tape1_CloseTape(blnCancel As Integer)' Close event for first instance. This is an object itself which in the original embodiment gets set up with the instance so that this object is messaged when an instruction to close is sent. This object will be monitored by the instance.

blnCancel=True

End Sub

Private Sub Tape2_CloseTape(blnCancel As Integer)' Close event for second instance blnCancel=True End Sub Private Sub Tape3_CloseTape(blnCancel As Integer)' Close event for the third instance blnCancel=True End Sub Name: Tur1

Purpose: Test Unit Ready #1—Normal.

Input: None

Output: None

Return: None

Private Sub Tur 1( )

Dim bytPacket(5) As Byte

Dim bytStatus As Byte

Dim bytData(0) As Byte

Dim lngTransfered As Long

Dim intErrors As Integer

Tape1.SendPacket bytPacket, bytStatus, bytData, lngTransfered' SCSI packet is sent (method)

If bytStatus<>gintScsiGood Then intErrors=intErrors+1

If intErrors<>0 Then MessageBox Me.hWnd, "TUR #1 had"& intErrors & "error(s)", Me.Caption & "Status", gintOkInfo End Sub Conclusion The general form of creatable classes of software objects for emulating peripherals has been described, along with a description of how to create and use instances thereof. The specific preferred embodiment peripheral software object emulator class described is a tape drive. Details of a particular tape drive emulator and its instruction set and functioning along with a source code listing of how to create and use instances have been explained so as to enable one of ordinary skill in these arts to easily adapt the inventive concepts to any peripheral emulator. Accordingly the scope of the claimed invention is limited only by the appended claims.

What is claimed is:

1. In an object oriented programming (OOP) environment, wherein object instances are allocated properties from a message passing entity, wherein said message passing entity can be an external program or an object instance, and wherein an object instance can be allocated a non-legacy format data file entity, and wherein said object instance within said OOP environment has routines that operate to cause said object instances to be responsive to messages passed to them, an emulator-type object instance comprising:

a link for accessing, manipulating, and writing data in said allocated data file entity in accord with an instruction received by said emulator-type object instance from said message passing entity through said OOP environment, wherein said data file entity has a set of data fields, each data field comprising a body field and an associated header field, said header field comprising data descriptive of said body field's size, wherein said link provides for passing of instructions and data in a legacy format, a set of mnemonics identifying said emulator-type object instance as a unique instance of an emulator object class, a set of property parameters, each property parameter identifying said emulator-type object instance's state, a set of routines enabling actions to be performed in accord with said passed legacy instructions and data by said emulator-type object instance, including at least a first routine for modifying data in a data file entity which may be allocated to said emulator-type object, wherein said data file entity alloctated to said emulator-type object is a one of said non-legacy format data file entities, and wherein, when an instruction is received by said emulator-type object instance, and said instruction requests said emulator-type object instance to act on data of said allocated data file entity, at least one of said set of property parameters specifies location information in said legacy format for said first routine.

2. An emulator-type object instance as set forth in claim 1 wherein said first routine enables writing to said data file entity and wherein said at least one property parameter specifies a current location of a read/write head position.

3. An emulator-type object instance as set forth in claim 1 wherein said first routine enables reading from said data file entity and wherein said at least one property parameter specifies a current location of a read/write head position.

4. An emulator-type object instance as set forth in claim 1 wherein said set of routines includes a routine responsive to event messages sent to said object instance for terminating said emulator object instance if said event message requests such termination.

5. An emulator-type object instance as set forth in claim 1 wherein said emulator object instance emulates a tape drive.

6. An emulator-type object instance as set forth in claim 1 wherein said routines are processes which cause actions related to said data file entities to be performed by said emulator object instance, and said actions comprise:
   erasing data in an allocated data file entity,
   loading or unloading a data file entity so as to become allocated or unallocated to said emulator-type object instance,
   reading data from an allocated data file entity, writing data to an allocated date file entity.

7. An emulator-type object instance as set forth in claim 1 wherein said routines are processes which cause actions related to said data file entities to be performed by said emulator object instance, and said actions comprise tape emulation processes named: ERASE, INQUIRY, LOAD-UNLOAD, LOCATE, LOG SELECT, LOG SENSE, MODE SELECT, MODE SENSE, READ, READ POSITION, REQUEST SENSE, REND, SPACE, TEST UNIT READY, WRITE, and WRITE FILEMARK.

8. An object oriented programming (OOP) environment, wherein object instances are allocated properties from a message passing entity, wherein said message passing entity can be an external program or an object instance, and wherein an object instance can be allocated a non-legacy format data file entity, and wherein said object instance within said OOP environment has routines that operate to cause said object instances to be responsive to messages passed to them, wherein said OOP defines at least a first class of objects comprising emulator-type object instances, wherein each such emulator-type instance comprises:
   a link for accessing, manipulating, and writing data in said allocated data file entity in accord with an instruction received by said emulator-type object instance from said message passing entity through said OOP environment, wherein said data file entity has a set of data fields, each data field comprising a body field and an associated header field, said header field comprising data descriptive of said body field's size, wherein said link provides for passing of instructions and data in a legacy format,
   a set of mnemonics identifying said emulator-type object instance as a unique instance of an emulator object class,
   a set of property parameters, each property parameter identifying said emulator-type object instance's state,
   a set of routines enabling actions to be performed in accord with said passed legacy instructions and data by said emulator-type object instance, including at least a first routine for modifying data in a data file entity which may be allocated to said emulator-type object, wherein said data file entity allocated to said emulator-type object is a one of said non-legacy format data file entities, and
   wherein, when an instruction is received by said emulator-type object instance, and said instruction requests said emulator-type object instance to act on data of said allocated data file entity, at least one of said set of property parameters specifies location information in said legacy format for said first routine.

9. An OOP environment as set forth in claim 8 wherein said class of emulator-type object instances has a user operable window through which said OOP is responsive to a user request to instantiate an individual emulator-type object instance.

10. An OOP environment as set forth in claim 9 wherein said OOP is also responsive to a user request through said user operable window to allocate data file entities to said individual emulator-type object instance.

11. An OOP environment as set forth in claim 9 wherein said user operable window has a means to identify data file entities to a user.

12. An OOP environment as set forth in claim 11 wherein said data file entities are identifiable to said user whether said data file entities are available in an external computer resource or an internal computer resource.

13. An OOP environment as set forth in claim 9 wherein said user operable window provides access to a user to send event messages sent to said emulator-type object instance for terminating said emulator-type object instance.

14. An OOP environment as set forth in claim 8 wherein said class of emulator-type object instances has a routine through which said OOP environment is responsive to a program request to instantiate an individual emulator-type object instance.

15. An OOP environment as set fort in claim 8 wherein said class of emulator-type object instances has a user operable window through which said OOP environment is responsive to a user request to allocate data file entities to an individual emulator-type object instance.

16. An OOP environment as set forth in claim 15 wherein said user operable window has a means to identify data file entities to a user.

17. An OOP environment as set forth in claim 16 wherein said data file entities are identifiable to said user whether said data file entities are available in an external computer resource or an internal computer resource.

18. A method of emulating a data storage peripheral in a computer system employing an Object Oriented Programming (OOP) environment comprising:
   a. establishing a class defining specific attributes of the emulation object said attributes defined including a set of data manipulation routines with names used by a peripheral being emulated for manipulating data in a data file Virtually in a manner mimicking a manner in which said peripheral being emulated manipulates data within said peripheral responsive to messages that may have routines of the same names, and including a linking routine for providing instances of the class with data files to allow said data manipulation routines to operate upon such data files,
   b. establishing an instance of the object,
   c. sending a legacy formatted message to the object instance defining the attribute parameters for the instance,
   d. ascribing control to said instance over a particular non-legacy formatted data file using said linking routine,
   e. sending a message to said object instance requesting a data operation affecting data in said data file using one of said names,
   f. manipulating the data file in a non-legacy manner by the object instance.

19. The method of claim 18 further comprising:

sending manipulated data in a legacy format.

20. A method of emulating a data storage peripheral in a computer system employing an Object Oriented Programming (OOP) environment comprising:

a. establishing a class defining specific attributes of the emulation object said attributes defined including a set of data manipulation routines with names used by a peripheral being emulated for manipulating data in a data file virtually in a manuer mimicking a manner in which said peripheral being emulated manipulates data within said peripheral responsive to messages that may have routines of the same names, and including a linking routine for providing instances of the class with data files to allow said data manipulation routines to operate upon such data files, b. establishing an instance of the object, c. sending in a legacy manner a message to the object instance defining the attribute parameters for the instance, d. ascribing control to said instance over a particular data file using said linking routine, e. sending data in a non-legacy to said object instance with a message requesting said data be incorporated into said data file, and f. incorporating the sent data into said data file in a format of the data file.

21. A method for providing tape drive simulation in a computer system in an Object Oriented Programming environment wherein said environment has a class defining specific attributes of a tape drive emulator object said attributes defined including a set of data manipulation routines with names used by a peripheral being emulated for manipulating data in a data file virtually in a manner mimicking a manner in which said peripheral being emulated manipulates data within said peripheral responsive to messages that may have routines of the same names, and including a linking routine for providing instances of the class with data files to allow said data manipulation routines to operate upon such data files, said method comprising:

operating on data in a data file accessible by a computer system for an linking to an instance of said tape drive emulator object, running a legacy software program, allowing, said legacy software program to use data in said data files by communicating in messages having instructions meant for a tape drive by sending said instructions to said tape drive emulator object and by sending and receiving data between said legacy software program and said tape drive emulator object.

22. A method for providing simulation of the data storage operations of a peripheral associated with a computer system that is running an Object Oriented environment wherein said environment has a class defining specific attributes of a data storage peripheral emulator object said attributes defined including a set of data manipulation routines with names used by a peripheral being emulated for manipulating data in a data file virtually in a manner mimicking a manner in which said peripheral being emulated manipulates data within said peripheral responsive to messages that may have routines of the same names, and including a linking routine for providing instances of the class with data files to allow said data manipulation routines to operate upon such data files, said method comprising:

operating on data in a data file accessible by a computer system for an linking to an instance of said data storage peripheral emulator object, running a legacy software program, allowing said legacy software program to use data in said data files by communicating in messages having instructions meant for an actual peripheral by sending said instructions to a data storage peripheral emulator object and by sending and receiving data between said legacy software program and said data storage peripheral emulator object.

\* \* \* \* \*